United States Patent [19]

Le Pesant

[11] Patent Number: 4,636,785

[45] Date of Patent: Jan. 13, 1987

[54] INDICATOR DEVICE WITH ELECTRIC CONTROL OF DISPLACEMENT OF A FLUID

[75] Inventor: Jean-Pierre Le Pesant, Gif Sur Yvette, France

[73] Assignee: Thomson-CSF, Paris, France

[21] Appl. No.: 592,282

[22] Filed: Mar. 22, 1984

[30] Foreign Application Priority Data

Mar. 23, 1983 [FR] France ................. 83 04745

[51] Int. Cl.⁴ ............................................. G09G 3/20
[52] U.S. Cl. ..................................... 340/753; 340/783; 340/787; 340/788; 350/355
[58] Field of Search ............... 340/753, 763, 783, 787, 340/788; 350/355, 363

[56] References Cited

U.S. PATENT DOCUMENTS

| | | | |
|---|---|---|---|
| 3,648,269 | 3/1972 | Rosenweig et al. | 340/788 |
| 3,936,816 | 2/1976 | Murata | 340/763 |
| 4,402,062 | 8/1983 | Batchelder | 340/783 |
| 4,418,346 | 11/1983 | Batchelder | 340/783 |
| 4,569,575 | 2/1986 | Le Pesant et al. | 350/355 |

Primary Examiner—Gerald L. Brigance
Assistant Examiner—Jeffery Brier
Attorney, Agent, or Firm—Oblon, Fisher, Spivak, McClelland, & Maier

[57] ABSTRACT

The displacement of a fluid is controlled electrically in a device employed primarily for storage and display of digital data. The device comprises a capillary space delimited by two confinement plates, the internal faces of which are fitted with electrodes connected to an electric generator. The capillary space is shared by two immiscible fluids and at least one displaceable fluid marker is created within the capillary space in the form of a globule of the fluid which has the highest dielectric permittivity.

19 Claims, 9 Drawing Figures

INDICATOR DEVICE WITH ELECTRIC CONTROL OF DISPLACEMENT OF A FLUID

BACKGROUND OF THE INVENTION

1. Field of the Invention

The present invention relates to devices for storing and displaying digital data by means of fluid markers which are caused to undergo displacements within a capillary space delimited by two confinement plates. The fluid which constitutes the markers shares the volume of the capillary space with a second fluid which is not miscible with the first fluid in order to ensure durable splitting into two phases. The heterogeneous fluid layer which is pinched or "squeezed" between the two confinement plates is therefore formed of a globular phase on each side of which is located an adjacent interstitial phase. The volume of each globule is such as to be squeezed between the confinement plates. This globule thus constitutes a marker which has two degrees of freedom and which is capable of displacement within the area of the capillary space, of taking up a fixed position while forming capture zones therein and of interacting with other globules which perform the function of a reverse supply of fluid.

2. Description of the Prior Art

Fluid displacement devices which do not require mechanical elements such as pistons, pumps, turbines, and so on, are usually based on the modification of the physicochemical properties of the fluids to be displaced. It is possible to contemplate the use of means such as thermosiphons, convectors, evaporators, circulators based on electroconvection or on magnetohydrodynamics. The disadvantage of these means, however, is that they call for relatively high power consumption since different potential applications entail the need to circulate an electric current, to produce a magnetic field, to produce an expansion, to produce thermal or electrical contraction, to produce a change in phase of a substance, and so on.

The problem presented by the displacement of a fluid by means of an electrical control system without having recourse to mechanical elements while at the same time ensuring low power consumption presupposes that it is possible to generate sufficient driving power to overcome forces other than forces of gravity.

A device for indicating fluid displacement must in fact be capable of operating correctly in all positions and to withstand accelerations without any difficulty. In consequence, position maintenance of the fluid must be dependent on forces such that inertia forces may be considered negligible in comparison. These forces must be overcome by a force of electrical origin which limits power consumption to a strict minimum.

The present invention proposes to solve this problem by utilizing surface tension forces, interfacial tension forces and forces arising from electric polarization of a dielectric fluid. The surface tension forces ensure position maintenance of small quantities of fluid flowing within a capillary space of small height since gravitational forces become negligible with respect to the capillary forces. The forces generated by polarization of a dielectric attain high values when the electric field gradient is very high, which can readily be obtained by means of a voltage applied to closely spaced electrodes. This technique does not entail the need to pass an electric current through the fluid either before, during or after its displacement.

SUMMARY OF THE INVENTION

The invention is directed to an indicator device providing electric control of the displacement of a fluid which performs the function of a marker. The distinctive feature of the invention lies in the fact that the device comprises two confinement plates which delimit a capillary space whose volume is shared by at least two immiscible fluids having different permittivities. One of said fluids has a globular structure on each side of which is located an adjacent interstitial structure of the other fluid. Each globule of said globular structure has a volume such that it is squeezed by said confinement plates and constrained to occupy a capture zone by the nonuniformity of the surface tension forces over the area of said capillary space. Said confinement plates are provided with means for inducing an electric field gradient which generates by electric polarization of said fluids an electromotive force which makes it possible to overcome said surface tension forces.

BRIEF DESCRIPTION OF THE DRAWINGS

Other features of the invention will be more apparent upon consideration of the following description and accompanying drawings, wherein.

DESCRIPTION OF THE PREFERRED EMBODIMENTS

In the description which now follows, electric control of the displacement of a fluid makes it possible to establish within a capillary space confined between two plates a displacement of fluid markers derived from the fractionation or splitting of a fluid mass. Digital data can thus be materialized by one or a number of fluid globules according to the positions occupied by these latter within the area of the capillary space. The displacement of a globule between two positions under the guidance of an electric control system of the all-or-none type makes it possible to perform a binary memory function. The action of surface tension forces may suffice to ensure that a globule is maintained in position after it has been displaced electrically. On condition that at least one of the confinement plates is permeable to light, the memory state can be visually displayed and a device designed on this conceptual basis becomes an indicator. By carrying out step-by-step displacements of a globule, it is possible to provide a shift-register function. Another possibility, however, consists in making arrangements such that a globule is detached from a fluid mass or subsequently returns to this fluid mass, which is tantamount to either creation of annihilation of the fluid marker globule. By virtue of these different possibilities of displacement, of splitting and of recombination of fluid globules, it is an easy matter to store in memory or to display binary digital data blocks. The detection of the presence of a globule by means of one of its physical characteristics can produce electric signals which are typical of the reading of a memory. This detection can advantageously be based on the variation in electrical capacitance resulting from the differentiated permittivities of the fluids which are present. The recombination of a number of globules permits point-by-point visual display of any graphic character, sign or representation.

Figure 1:
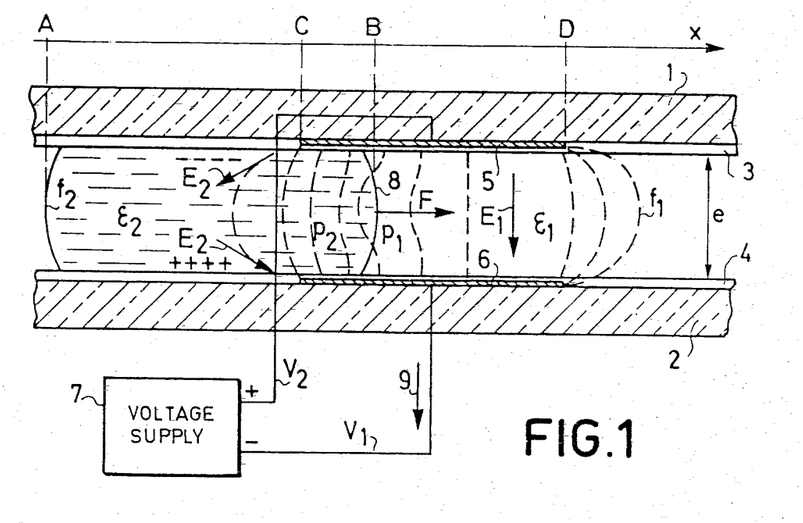
FIGS. 1 and 2 are explanatory diagrams of a cross section of an indicator device.

In its most elementary form illustrated in FIG. 1, the indicator device providing electric control of displacement of a fluid comprises a capillary space having a height e in which two immiscible dielectric fluids are both present together. The capillary space is delimited by two rigid confinement plates 1 and 2 of glass, for example. The height e is chosen equal to or smaller than one millimeter in order to ensure that the capillary forces predominate over the gravitational forces. The internal faces of the plates 1 and 2 have been subjected to a preparation which consists of suitable cleaning and formation of surface deposits 3 and 4. The intended function of these deposits is to ensure that the displacement of the fluid or fluids which it is desired to control is prevented from forming capillary films. By way of non-limitative example, the capillary space located between the deposits 3 and 4 is occupied by a gaseous fluid or a vapor $f_1$ having a dielectric permittivity $\epsilon_1$. A second fluid $f_2$ is introduced into part of the closed volume of the capillary space. The second fluid $f_2$ exhibits a dielectric permittivity $\epsilon_2$ which is higher than $\epsilon_1$ and takes the form of a globule which extends for example between the abscissae A and B. In order to displace the globule $f_2$ electrically in the positive direction of the axis x, the internal faces of the plates 1 and 2 are provided in accordance with the invention with a pair of electrodes 5 and 6 which are coated in particular with the deposits 3 and 4. These electrodes 5 and 6 which occupy a region located between the relatively displaced abscissae CD are connected to an electric generator 7 and this latter delivers potentials $V_2$ and $V_1$. The difference between these potentials produces volume forces which, related to the interface 8, are equivalent to a motional force F.

The physical origin of the motional force F is explained by the presence within the material media of positive and negative electric charges which can be either free or bound. In the presence of an induction electric field $\vec{E}_o$, the free charges are capable of moving within the entire volume of material which is subjected to the electric field, which constitutes the phenomenon of electric conduction. This phenomenon is not utilized within the sphere of application of the present invention although a low conductivity of the fluids employed is acceptable. On the other hand, the electric charges bound by the atoms and molecules give rise to electric dipole moments. The material medium reacts with the induction field $\vec{E}_o$ as a result of an electric polarization $\vec{P}$ which is the sum, in the volume subjected to the field, of the induced dipole moments and of those which already exist by reason of the particular symmetries of the molecules.

This dielectric behavior is expressed by the vector relati $\vec{E} = \vec{E}_o + \vec{E}'$ where $\vec{e}'$ is the electric field produced by the polarization $\vec{P}$ and $\vec{E}$ is the resultant electric field in the material medium.

The dielectric behavior of a material medium is given by tensor relation which is written $P_u = X_{uv} E^v$ where $X_{uv}$ is the electric susceptibility tensor. In the case of an isotropic medium, a more simple relation is employed and this is the relation $\vec{P} = (\epsilon - \epsilon_o)\vec{E}$ where $\epsilon_o$ is the permittivity of free space and $\epsilon$ is the permittivity of the dielectric. In this case, the force $\vec{F}$ which is exerted on a medium of volume v subjected to the field $\vec{E}_o$ is expressed by the relation:

$$\vec{F} = \int_v (\vec{P} \cdot \vec{grad}\,) \vec{E}_o\, dv. \tag{1}$$

This force is a volume force which is larger as the polarization is stronger and the field gradient is of a higher order.

The application of this relation to heterogeneous media subjected to nonuniform electric fields makes it possible to define a displacement force of volume origin which is capable of overcoming restoring forces such as surface tension forces.

In more exact terms, operation of the device shown in FIG. 1 is achieved in accordance with the invention by choosing the fluids $f_1$ and $f_2$ with a view to ensuring that the resultant electric polarization within the fluid $f_2$ is larger than that of the fluid $f_1$. Thus the modulus of the force $\vec{F}_2$ calculated by means of relation (1) for the fluid $f_2$ exceeds the modulus of the force $\vec{F}_1$ calculated by means of the same relation for the fluid $f_1$. This produces on the interface 8 of the two fluids an overpressure $p_2$ on the side corresponding to the fluid $f_2$ which is higher than the overpressure $p_1$ on the side corresponding to the fluid $f_1$. The general result thereby achieved is the same as if a motional force F were applied to the interface 8. On condition that the forces which counteract this motion (that is, capillary force, surface tension, interfacial tension and viscosity) are overcome, the fluid $f_2$ drives back the fluid $f_1$ in order to occupy that portion of the closed volume which is located between the electrodes 5 and 6. This work corresponds to the supply of electric power by the generator 7 which delivers a quantity of electricity q at a potential difference $V_2 - V_1$ since the electrical capacitance of the capacitor formed by the electrodes 5 and 6 has increased whereas the potential difference between the capacitor plates had been maintained constant.

In order to provide a clearer illustration of the operation which consists of electrostatic aspiration of the globule $f_2$ into the interelectrode space, there are shown in dashed lines in FIG. 1 the lines of electric force with the electric field vectors $E_1$ and $E_2$ and the positive and negative bound charges produced by polarization of the fluid $f_2$.

Figure 2:
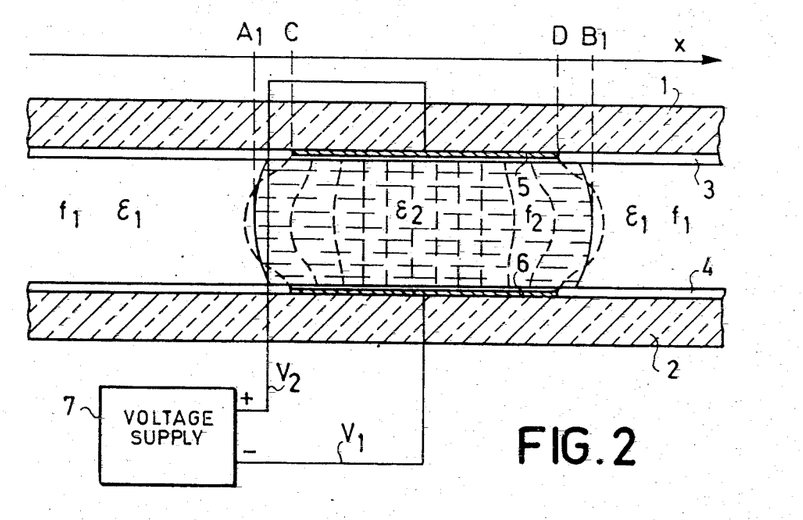

FIG. 2 represents the final state. It is apparent that the globule $f_2$ has come into position so as to occupy the region delimited by the abscissae $A_1$ and $B_1$ which extends symmetrically with respect to the region CD fitted with electrodes. The globule which has shifted into the region $A_1B_1$ can remain captive by virtue of the potential difference $V_2 - V_1$ which is maintained.

In accordance with the invention, however, suppression of the potential difference will allow a restoring force to remain so as to maintain the globule in the captive state within the interelectrode region. In fact, the deposits 3 and 4 are of sufficiently small thickness to ensure that the molecular forces produce action between the material of the electrodes 5 and 6 and the fluid $f_2$ in order to fix this latter in the position illustrated in FIG. 2. The generator 7 is incapable of dislodging the globule $f_2$ from the capture zone to which said globule has moved.

Another feature provided by the invention is the reversibility of displacement of a globule, this being achieved by means of special arrangements.

Figure 3:
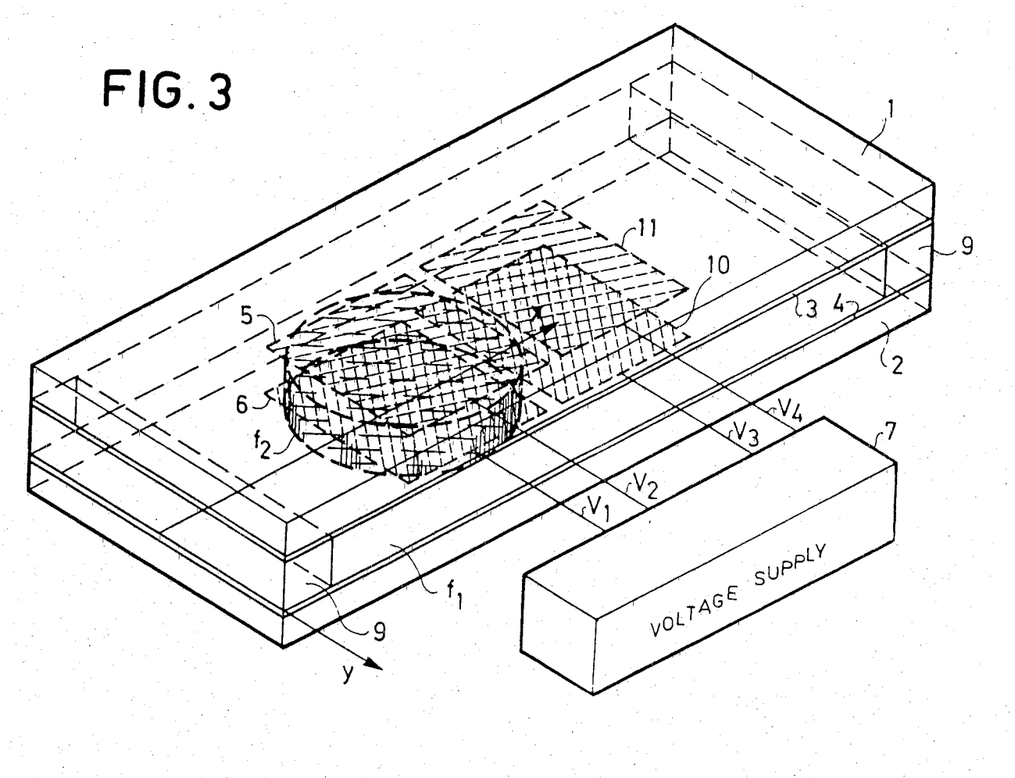
FIG. 3 is a view in isometric perspective showing an indicator device in accordance with the invention.

FIG. 3 is a view in isometric perspective showing a device for electric control of displacement in accordance with the invention. In this figure, the same references designate the same elements as in FIGS. 1 and 2. The plates 1 and 2 are joined together by means of spacer members 9 and there is also shown a second pair of electrodes 10 and 11 which are placed next in succession to the pair of electrodes 5 and 6 in the direction of the axis x. The electric generator 7 delivers potentials $V_3$ and $V_4$ to the electrodes 10 and 11.

FIG. 3 shows in dashed outline the circular contour of a fluid globule $f_2$ which is capable of moving over the entire area of the plane x-y. By way of example, the electrodes 5, 6, 10 and 11 have a square shape and have dimensions of 100 microns across the sides. The spacer members 9 have a height of 10 to 20 microns and the space between the electrode 5 and the electrode 11 is equal to 20 microns. The fluid $f_1$ which surrounds the globule $f_2$ is air and the fluid $f_2$ is selected from the hydrocarbons such as alkanes from $C_5$ to $C_{25}$, ketones (acetone, cyclohexanone, methylethylketone) or nitro derivatives (nitrobenzene, nitrotoluene). The electric generator 7 can supply the potential differences $V_2 - V_1$ and $V_4 - V_3$ of the order of 100 to 300 volts for providing displacement electric fields of the order of $5 \times 10^6$ to $3 \times 10^7$ volts per meter. The volume of the fluid globule $f_2$ confined between the plates 1 and 2 is calibrated in such a manner as to project to a slight extent beyond the contour of the electrodes 5 and 6 but it could also be increased in order to overlap on the pair of electrodes 10 and 11.

In order to transfer the globule $f_2$ from the interelectrode space 5, 6 to the interelectrode space 10, 11, the potential difference $V_2 - V_1$ is either cancelled or reduced and the potential difference $V_4 - V_3$ is established. One forward step is thus carried out in the positive direction of the axis x. In order to return the marker globule to its original position, it is necessary to cancel or reduce the potential difference $V_4 - V_3$ and to re-establish the potential difference $V_2 - V_1$. If the two potential differences are applied at the same time, the globule does not tend to shift but if it passes beyond one set of electrodes, the globule is capable of undergoing deformation in an endeavor to conform as closely as possible to the sum of areas of the electrodes 5 and 11.

Figure 4:
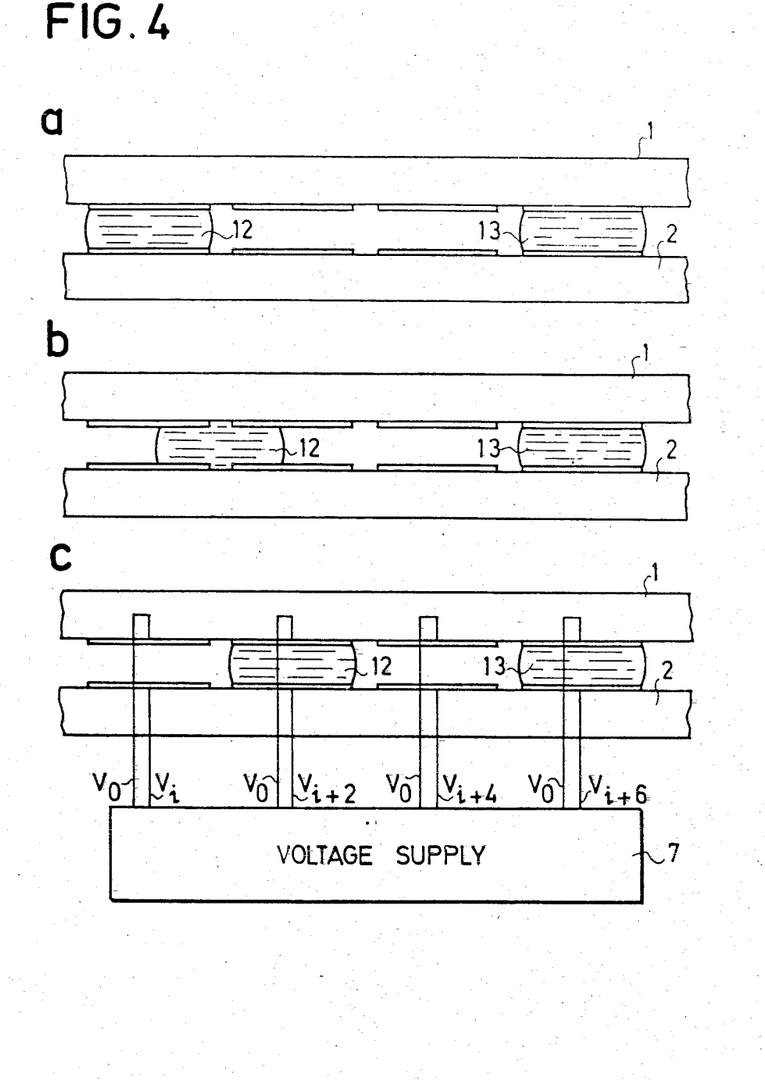
FIGS. 4 and 5 are explanatory diagrams of moving and splitting a globule.

The mode of operation illustrated in FIG. 3 can be generalized as shown at (a), (b) and (c) in FIG. 4, in which provision has been made on the plates 1 and 2 for four pairs of electrodes which can form aligned arrays along the axes x or y of the plane in which displacement of the globules 12 and 13 is caused to take place. The situation illustrated at (a) is such that two globules 12 and 13 are restrained in the captive state by the outer pairs of electrodes. In order to shift the globule 12 toward the right as illustrated at (c) in FIG. 4, a potential difference $V_{1+2} - V_o$ is created and the potential difference $V_i - V_o$ is reduced or cancelled. At (b) in FIG. 4, the globule 12 has performed one-half its displacement and can take up any position between the two left-hand pairs of electrodes when the potential differences $V_i - V_o$ and $V_{i+2} - V_o$ are applied simultaneously. A potential difference $V_{1+6} - V_o$ can usefully be applied in order to constrain the globule 13 to remain in position. It is also possible to produce displacements of the globules 12 and 13 in opposite directions by modifying the potential differences applied. In the event that these globules touch each other, they may coalesce in such a case.

Figure 5:
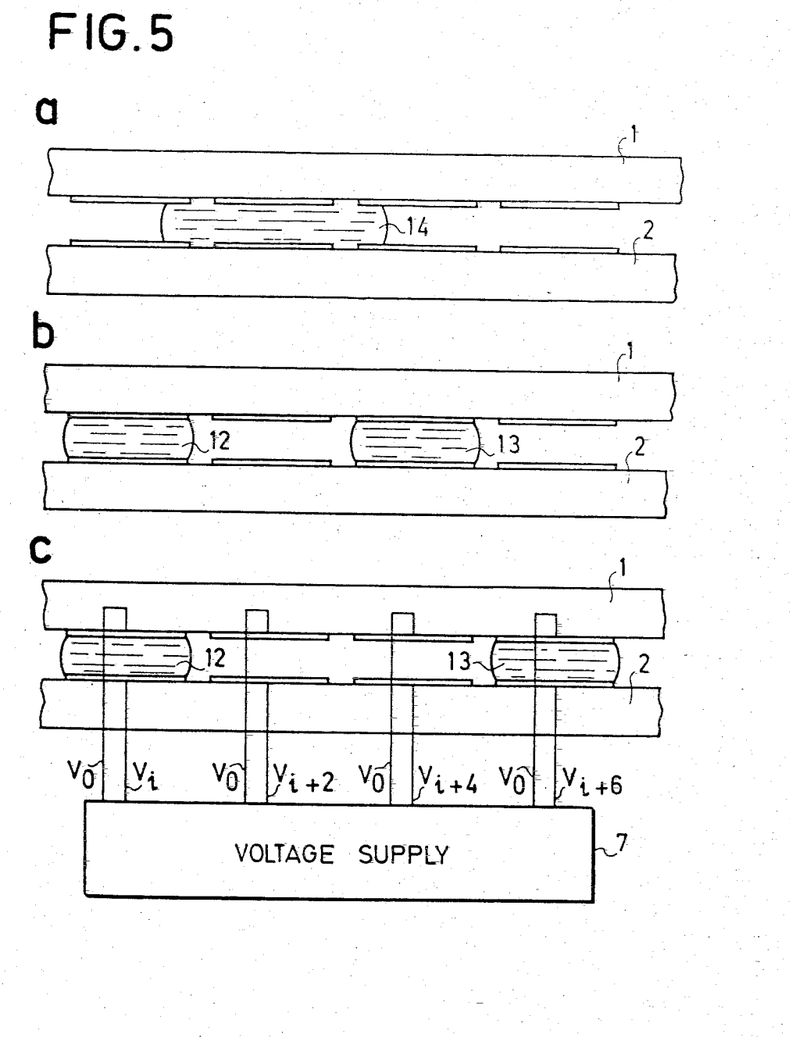

Conversely, the invention contemplates the possibility of splitting a globule as illustrated in FIG. 5.

The starting arrangement illustrated at (a) in FIG. 5 shows a globule 14 which is centered on the second pair of electrodes by means of a potential difference $V_{1+2} - V_o$. The globule 14 overlaps on the adjacent pairs of electrodes which can also be subjected to potential differences.

In order to split-up the globule 14 into elementary globules 12 and 13, the potential difference $V_{1+2} - V_o$ is cancelled and, if this has not already been done, the potential differences $V_i - V_o$ and $V_{i+4} - V_o$ are applied. The situation illustrated at (b) in FIG. 5 is then obtained.

In order to displace the elementary globule 13 toward the right, the potential difference $V_{i+4} - V_o$ is cancelled and the potential difference $V_{i+6} - V_o$ is established. The situation illustrated at (c) in FIG. 5 is thus obtained.

In the procedure described in the foregoing, in order to obtain a wholly distinctive effect, it is essential to ensure that the fluid is localized on the one hand within the region which serves as a reservoir and on the other hand in those regions to which finite volumes of this fluid have been transported. Excessive "spontaneous" spreading within the internal space delimited by the plates 1 and 2 is liable to impair the operation of the device.

In accordance with an important feature of the invention, it is necessary to make a suitable choice of the fluids which are present and to adopt suitable surface treatments in order to control the fluid-solid interfacial tensions (contact with the walls) and the fluid-fluid interfacial tensions (contact between fluids $f_1$ and $f_2$).

Spreading of the fluid can be controlled and counter-acted even more effectively by a method which consists in employing electrodes for producing electrical volume forces.

The application of restoring electrical volume forces permits accurate management of the formation of globules of predetermined caliber obtained from a reserve supply of fluid.

Figure 6:
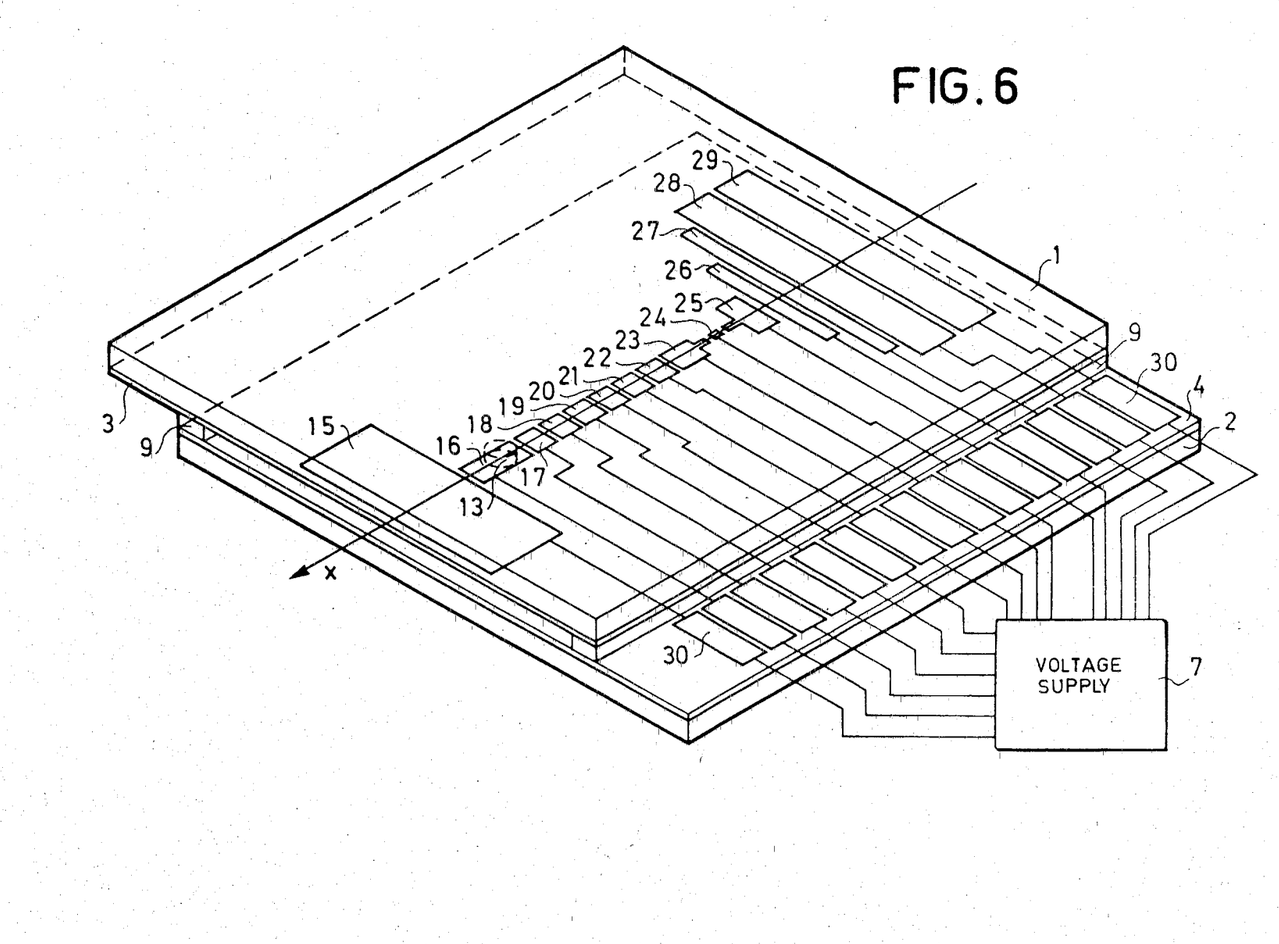
FIG. 6 is a view in isometric perspective showing an alternative embodiment of the invention.

The view in isometric perspective of FIG. 6 illustrates an indicator device for calibrating the volume of fluid of the markers which it is desired to displace from one point to the next. This device comprises two glass plates 1 and 2 provided with electrodes on their opposite faces. For the sake of simplicity of the figure, only the electrodes 15 to 29 carried by the lower plate 2 are illustrated but these electrodes define capacitor cells with a second set or a single counter-electrode carried by the plate 1. Spacer members 9 define with the plates 1 and 2 a capillary space which is partly filled with a fluid $f_2$. The remainder of the volume of this space contains air in order to perform the function of the fluid $f_1$. The greater part of the fluid $f_2$ is contained within the peripheral regions in which the largest electrodes 15 and 16 and 26 to 29 are present. A small fraction of the fluid $f_2$ is shown as it is flowing along the axis x. This fluid is in the form of a globule 13 located between the plates 1 and 2. The supply of electric current to the electrodes 15 to 29 is carried out by an electric generator 7 which produces potential differences at suitable instants. Said potential differences are intended to have the effect of splitting a globule in order to inject this latter into a displacement line or to cause the globule to travel along this line. In order to facilitate connections, each plate 1 or 2 is provided with a comb 30, the contacts of which are connected to the electrodes 15 to 29 by means of small-section leads. The internal face of each plate 1 or 2 which is provided with its electrically conductive zones is coated with thin deposits 3 and 4 for preventing the fluid from spreading throughout the cavity located between said zones. This deposit is such that the fluid $f_2$ does not wet the confinement surfaces.

By way of example and without any implied limitation, the glass plates 1 and 2 are square flat sheets having dimensions of 5 cm across the sides and a thickness of 1.5 mm. The spacer members 9 are cut from a polymer film having a thickness of 24 microns such as, for example, a film of Mylar or Kapton (trademarks registered by Dupont de Nemours and Company).

Prior to assembly, these glass sheets are equipped with their electrodes deposited in accordance with microetching techniques. The electrodes 15 to 29 are formed by deposits of indium oxide and tin, for example of the type known as Baltracon and marketed by the Balzers Company. Annealing at 350° C. serves to make said deposits transparent to light. The configuration of the electrodes shown in FIG. 6 has been simplified but there can be distinguished a region forming a reserve supply of fluid and composed of electrodes 26 to 29 in the form of broad strips 0.5 to 4 mm in width and 2 to 30 mm in length. These electrodes are separated by gaps of small width (20 $\mu$m). The region which follows in the direction of the axis x has the effect of fractionating or splitting-up the fluid $f_2$ in order to produce the fluid marker globules 13. This region which performs the function of an injector is composed of electrodes 23 to 25 of square or practically square shape and having typically 0.5 mm on a side. The central electrode 24 which is shorter than the adjacent electrodes serves as a junction element between two narrowed extensions of the electrodes 23 and 25. The width of the electrode 24 and of the two extensions located on each side is typically 100 $\mu$m. There then follows the displacement region proper. This region is composed of a row of electrodes 16 to 22. Although not illustrated in FIG. 6, this row of electrodes can intersect with other rows, with the result that the marker globule 13 is capable of moving in all directions in lines which intersect each other. The last region performs a drainage function and is composed of an electrode 15 having a much larger area. This electrode can also be connected to the reserve supply of fluid by means of a row of displacement electrodes (not shown in FIG. 6).

The deposits 3 and 4 are formed after the electrodes have been deposited on the plates 1 and 2. These very thin deposits have a thickness of the order of one millimicron. By way of example, it is possible to apply an organosilane deposit, in particular alkylmethoxysilane, and more especially N,N-dimethyl-N-octadecyl-3-aminopropyltrimethoxysilyl chloride. This deposit has been polymerized in a nitrogen atmosphere at 110° C. after hydrolysis of the methoxysilane groups and formation of hydrogen and siloxane bonds on the substrate by chemisorption. By reason of the very small thickness of these surface treatments, higher wettability is observed at locations in which the organic deposit forms a coating on the electrodes. This effect is useful for ensuring that the fluid remains confined within the electrode regions. The fluorinated polymers can also constitute non-wettable confinement surfaces. In regard to the fluid $f_2$, it will be chosen so as to ensure that its dielectric permittivity is different from that of the fluid $f_1$. Furthermore, it is an advantage to ensure that the liquid to be displaced has high corrosion resistance and low electrical conductivity. The following filling fluids have been successfully employed:

| Liquid | Permittivity | Electrical conductivity ($\Omega^{-1}$ cm$^{-1}$) |
| --- | --- | --- |
| Cyclohexanone | 18.3 $\epsilon_o$ | $5 \times 10^{-18}$ |
| Nitrobenzene | 34.8 $\epsilon_o$ | $2 \times 10^{-10}$ |
| Hexane | 1.88 $\epsilon_o$ | $<10^{-16}$ |

In the device of FIG. 6, the glass plates 1 and 2 can be prepared in exactly the same manner and reversed in order to superimpose the configurations of electrodes while allowing the connection combs 30 to project. Since the glass plate regions which are not covered with electrodes are not conductive, this accordingly prevents any accidental migrations of fluid toward the regions which surround the electrodes. The leads which connect the electrodes to the combs 30 are so arranged as to prevent any overlap, thus attenuating the parasitic electric field produced by these connecting leads.

The operation of the device shown in FIG. 6 will be more clearly apparent by reference to FIG. 7 which again shows the arrangement adopted for fluid splitting in order to produce a fluid marker in the form of a globule.

Figure 7:
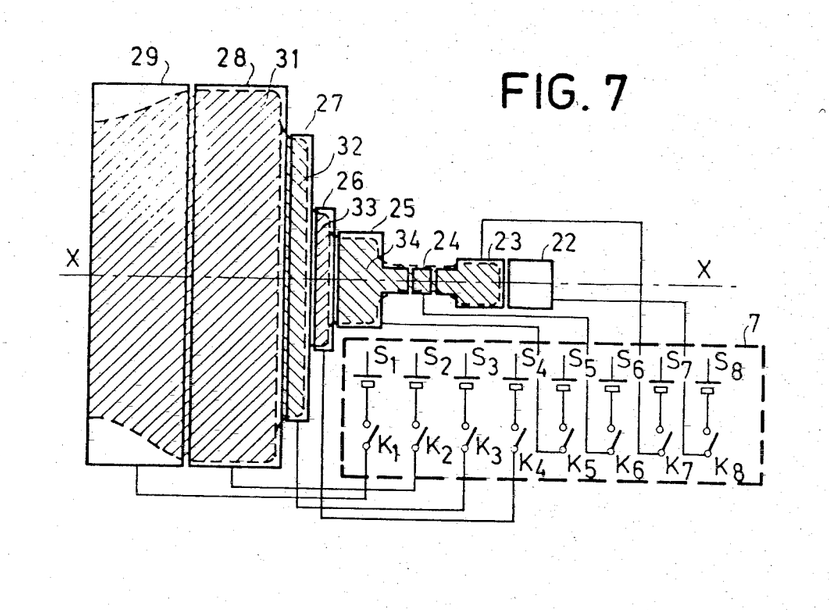
FIG. 7 is an explanatory diagram of fluid splitting.

In order that the explanation which now follows may be more readily understood, the electrical means for controlling the generator 7 are represented in this figure by an array of sources $S_1$ to $S_8$ for producing adjustable potential differences and by switches $K_1$ to $K_8$ which control the application of the potential differences. For the sake of enhanced clarity, the drawing shows only one series of connecting leads to the electrodes 22 to 29 whereas, in actual practice, another series of leads is provided between each channel of the generator 7 and the electrodes located opposite to the electrodes 22 to 29. It may be assumed that, at the outset, a large volume of fluid $f_2$ is available within the reserve constituted by the total area of the electrodes 28 and 29. It is postulated that all the switches are open and that the fluid $f_2$ occupies the reservoir region in accordance with the surface tension phenomena. When the switches $K_1$ and $K_2$ are closed, the fluid $f_2$ tends to conform more closely to the contour of the electrodes 28 and 29, the hatched shape of which is designated by the reference 31. When the switch $K_3$ is closed, the fluid $f_2$ flows in so as to occupy a supplementary zone 32 corresponding to the area of the electrode 27. By closing the switch $K_4$, the fluid $f_2$ continues to travel toward the right and accordingly fills the zone 33 which corresponds to the area of the electrode 26. The fluid is thus shaped and ready to be injected. Closing of the switches $K_5$, $K_6$ and $K_7$ produces a further progression of the fluid $f_2$ toward the right; the fluid thus occupies a zone 34 which corresponds to the shape of the complete assembly of electrodes 23, 24 and 25. This zone has a central constriction formed by the noses of the electrodes 23 and 25 and by the small bridging electrode 24. If the switch $K_6$ is now reopened, splitting-up of the liquid $f_2$ is produced at the level of the electrode 24 under the action of the electric restoring forces and of surface tension. The portion of fluid located to the right of the electrode 24 is maintained in the captive state by the electrode 23 and constitutes a calibrated globule which is ready to serve as a marker. The remaining fluid can be returned to the reserve supply 31 by opening the switches $K_3$ to $K_5$. The fluid globule which is formed opposite to the electrode 23 can be caused to begin its step-by-step progression by opening the switch $K_7$ and by closing the switch $K_8$. When a marker in the form of a fluid globule has completed its progression, it can be integrated with a reserve supply of fluid. In FIG. 6, a drainage region is provided within the area of the electrode 15. A fluid marker can also be caused to flow back to its source. If a marker of this type occupies the position of the electrode 23, it can be caused to flow back by opening the switch $K_7$ and by successively reclosing the switches $K_6$, $K_5$ which are reopened when the switch $K_4$ is reclosed, and so on in sequence.

It is therefore apparent that, with a range of potential differences applied in a transient manner and displaced in time, it is possible to generate a fluid marker, to cause the marker to travel forward or backward and finally to return it to a reserve supply. The fluid displacement control device as constructed in accordance with the data and explanations given with reference to FIG. 6 has permitted up to 2000 elementary displacements per second with potential differences varying within the range of 150 to 250 volts.

A point worthy of note is that the volume forces which ensure retention of a fluid can be regulated by varying the applied potential difference. It should further be noted that the retention of a fluid marker globule by a region having higher wettability makes it possible to suppress the potential difference after the marker globule has been attracted into this region, thus providing a memory effect.

Figure 9:
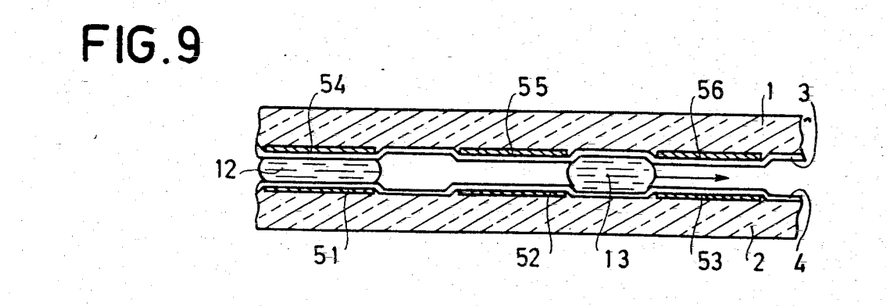
FIG. 9 is a fragmentary sectional view of an alternative embodiment of the device in accordance with the invention.

In the foregoing description, the capillary space is a lamellar volume of uniform height. As illustrated in the sectional view of FIG. 9, it is possible to form a capillary space having regions in which the spacing of the confinement surfaces is reduced. It is possible, for example, to use confinement plates 1 and 2 consisting of plates of molded or etched material, the internal faces of which have cup-shaped regions surrounding bosses. The control electrodes 54-51, 55-52 and 56-53 are disposed on the regions which form projections. This arrangement is advantageous inasmuch as it provides the possibility of increasing the restoring forces of capillary origin and of obtaining larger electric polarization at equal voltage. Thus the fluid marker globule 12 can be maintained more firmly within the electrode space 54-51. There is shown in FIG. 9 another fluid marker globule 13 during displacement between the interelectrode space 55-52 and the interelectrode space 56-53.

Figure 8:
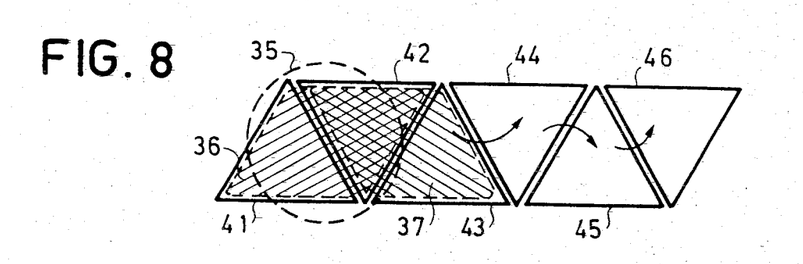
FIG. 8 illustrates a configuration of intercalated electrodes.

Another advantageous arrangement of electrodes is shown in FIG. 8. In order to form a fluid marker globule propagation channel, an interfitting series of triangular electrodes 41, 42, 43, 44, 45, 46 has been formed from a cut-out conductive strip. The circular contour 35 represents a fluid marker globule in the relaxed state. By applying a voltage to the electrodes 41 and 42, the fluid of the globule will tend to occupy the contour 36 in the shape of a parallelogram. In order to induce forward displacement of the globule, the voltage of the electrode 41 is switched-over to the electrode 43, thereby causing the globule to occupy the contour 37, the parallelogram shape of which is inclined in the other direction. The voltage of the electrode 42 is then switched-over to the electrode 44, and so on in sequence. By providing two contiguous electrodes under tension and carrying out the switching operations as indicated, the fluid marker globule travels as shown by the curved arrows.

As can readily be understood, the invention is not limited to the examples illustrated in the accompanying drawings since the shape and relative spacing of the electrodes can be adapted to produce splitting or displacement with the possibility of grouping electrodes together in order to define retention regions which are best suited to the desired mode of operation.

To conclude, it is useful to give orders of magnitude of various geometrical and electrical parameters which are applicable to the invention:

thickness between confinement surfaces within the range of 1 to 100 $\mu m$;

width of electrodes within the range of 1 $\mu m$ to 1 mm;

interelectrode distance over one and the same confinement surface: 1 $\mu m$ to 100 $\mu m$;

potential difference between electrodes of any one pair within the range of 50 volts to 500 volts;

electric field between electrodes of the same pair: $10^6$ $Vm^{-1}$ to $10^8$ $Vm^{-1}$;

operating frequency spacing within the range of 0 to 1 MHz;

volume of splittable fluid marker globule within the range of $10^{-10}$ to $10^{-18}$ $m^3$.

There has therefore been described in the foregoing a device providing electric control of fluid displacement in which a fluid is brought into a region by means of volume forces which result from electric polarization of the fluid and act in opposition to the capillary forces. These volume forces are produced by electrode pairs to which an adjustable potential difference is applied. The shapes given to the enclosed spaces controlled by the electrodes are such that, when the potential difference is either reduced or suppressed in an electrode pair which defines a retention or splitting region, the fluid is no longer in a minimum energy state, thus giving rise to a rearrangement of the fluid volume distribution. This rearrangement can consist of a relaxation of the fluid volume, the spreading perimeter of which tends toward a smaller value. This technique makes it possible to carry out the injector function for the purpose of producing fluid markers of calibrated volume in a reproducible manner, the function of circulator for the displacement of markers within the area of a capillary space shared by at least two fluids, and the function of drainage toward an enclosed space for receiving the fluid markers which have completed their displacement. It will of course be readily apparent that the control voltages can be provided either by a d.c. supply or by an a.c. supply. The use of a.c. voltages permits better control of ion transport phenomena. The capillary space of the device providing electric fluid-displacement control is advantageously an enclosed space.

What is claimed is:

1. A device providing electric control of displacement of a fluid which performs a display function, wherein said device comprises two confinement plates which define two internal faces and which are a small distance from each other to form a first volume which is shared by at least two immiscible fluids having different dielectric permittivities, a first fluid having a globular structure and a second volume and immersed in the second fluid, an electric generator connected to a plurality of electrode pairs where the electrodes of each pair are disposed opposite each other on the internal faces of said confinement plates, for inducing an electric field gradient so as to cause one of the two fluids having a higher permittivity to converge toward those regions of said first volume which are subjected to said electric field, wherein at least two of said electrode pairs constrict said second volume of said first fluid for the purpose of splitting said fluid, said electrode pairs being adapted to cooperate with said electric generator for splitting said second volume.

2. A device according to claim 1, wherein said electrode pairs are arranged in at least one row in order to produce the displacement of at least one display constituted by a volume of said fluid having a globular structure.

3. A device according to claim 1, wherein the internal faces of said confinement plates are coated with deposits which are not wetted by said second fluid.

4. A device according to claim 3, wherein the deposits are thin.

5. A device according to claim 1, wherein said first volume is delimited by two equidistant smooth surfaces.

6. A device according to claim 1, wherein said first volume is delimited by two surfaces, at least one of said surfaces being provided with recessed portions and projecting portions.

7. A device according to claim 1, wherein said first volume comprises at least one reservoir region and wherein a short central electrode is placed between said two electrode pairs, the width of said central electrodes being shorter than said electrode pairs and said electrode pairs being shorter than the remaining electrodes for withdrawing predetermined volumes of fluid from said reservoir region.

8. A device according to claim 7, wherein said electrode pairs each have a main portion and a narrowed extension, where the narrowed extension is equal to the width of the central electrode.

9. A device according to claim 7, wherein said first volume comprises at least one drainage region for collecting said predetermined volumes of fluid.

10. A device according to claim 1, wherein the fluid which has said globular structure is a liquid.

11. A device according to claim 1, wherein the second fluid is a gas or a vapor.

12. A device according to claim 1, wherein said first volume is an enclosed space.

13. A device according to claim 1, wherein at least one of said plates is formed of material which is transparent to light radiation.

14. A device according to claim 2, wherein the display is provided in the form of a fluid globule having a volume which extends across said small distance defined by said confinement plates.

15. A device according to claim 1, wherein said electrodes have a triagular shape and are arranged in a row with alternate electrodes being inverted, with the sides of adjoining electrodes being parallel and near each other, two contiguous electrodes being energized at each stage of progression of the display.

16. A device according to claim 1, wherein said electrode pairs are constituted by deposits of an electrically conductive material which is transparent to light radiation.

17. A device according to claim 1, wherein the field gradient induction means comprise electrodes of indium oxide and tin.

18. A device according to claim 17, wherein the electrodes are coated with a deposit of N, N-dimethyl-N-octadecyl-3-aminopropyltrimethoxysilyl chloride.

19. A device according to claim 17, wherein the fluid having the highest dielectric permittivity is cyclohexanone, nitrobenzene or hexane.

* * * * *